(12) United States Patent
Nagar et al.

(10) Patent No.: US 11,687,370 B2
(45) Date of Patent: Jun. 27, 2023

(54) ACTIVITY ASSIGNMENT BASED ON RESOURCE AND SERVICE AVAILABILITY

(71) Applicant: INTERNATIONAL BUSINESS MACHINES CORPORATION, Armonk, NY (US)

(72) Inventors: Raghuveer Prasad Nagar, Kota (IN); Sarbajit K. Rakshit, Kolkata (IN); Jagadesh Ramaswamy Hulugundi, Bangalore (IN); Prashanth Krishna Rao, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 389 days.

(21) Appl. No.: 17/101,962

(22) Filed: Nov. 23, 2020

(65) Prior Publication Data
US 2022/0164233 A1 May 26, 2022

(51) Int. Cl.
*G06F 9/50* (2006.01)

(52) U.S. Cl.
CPC .................. *G06F 9/5027* (2013.01)

(58) Field of Classification Search
None
See application file for complete search history.

(56) References Cited

U.S. PATENT DOCUMENTS

| 8,023,429 | B2 |  | 9/2011 | Briscoe |
| 8,949,847 | B2 | * | 2/2015 | Kim ........................ G06F 9/505 718/104 |
| 9,277,003 | B2 | * | 3/2016 | Doyle ................... G06F 9/5044 |
| 9,384,053 | B2 | * | 7/2016 | Suzuki ....................... G06F 9/50 |
| 9,778,957 | B2 | * | 10/2017 | Colson ............ G06Q 10/06311 |
| 9,877,169 | B1 |  | 1/2018 | Wang |
| 10,296,364 | B2 |  | 5/2019 | Sivasubramanian |
| 10,827,033 | B1 | * | 11/2020 | Balasubramanian ........................ G06F 9/5072 |

(Continued)

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Hiren P Patel
(74) *Attorney, Agent, or Firm* — Robert R. Aragona (57) ABSTRACT

An embodiment for resource management is provided. The embodiment may include receiving created text of an assigned activity to a proposed assignee. The embodiment may also include identifying information about the assigned activity. The embodiment may further include predicting resources and capabilities required to complete the assigned activity. The embodiment may also include identifying the proposed assignee. The embodiment may further include analyzing the resources and capabilities available on one or more devices of the proposed assignee. The embodiment may also include in response to determining the proposed assignee is able to complete the assigned activity, displaying to an assignor a predicted start time and time of completion of the assigned activity and in response to determining the proposed assignee is unable to complete the assigned activity, recommending to the assignor another assignee that is able to complete the assigned activity.

20 Claims, 5 Drawing Sheets

(56) References Cited

U.S. PATENT DOCUMENTS

| | | | | |
|---|---|---|---|---|
| 2006/0184626 | A1* | 8/2006 | Agapi | G06F 9/5055 709/205 |
| 2009/0048896 | A1* | 2/2009 | Anandan | G06Q 10/06 705/7.26 |
| 2010/0281095 | A1* | 11/2010 | Wehner | G06F 9/5072 709/201 |
| 2012/0159508 | A1* | 6/2012 | Katagi | G06F 9/5094 718/104 |
| 2012/0254280 | A1 | 10/2012 | Parker, II | |
| 2012/0304187 | A1* | 11/2012 | Maresh | G06Q 10/0631 718/103 |
| 2014/0228976 | A1* | 8/2014 | K. S. | F03D 7/048 700/9 |
| 2014/0237477 | A1* | 8/2014 | Cadambi | G06F 9/5044 718/103 |
| 2014/0351310 | A1 | 11/2014 | Ligman | |
| 2015/0236974 | A1* | 8/2015 | Minamitake | G06F 9/505 709/226 |
| 2015/0347944 | A1* | 12/2015 | Aparimit | G06Q 10/06313 705/7.23 |
| 2016/0077674 | A1 | 3/2016 | Forster | |
| 2016/0292011 | A1* | 10/2016 | Colson | G06F 9/5027 |
| 2016/0323161 | A1* | 11/2016 | Cuervo Laffaye | H04L 67/1001 |
| 2017/0090990 | A1* | 3/2017 | Furman | G06F 9/5061 |
| 2017/0249574 | A1* | 8/2017 | Knijnik | G06Q 10/06313 |
| 2018/0176148 | A1* | 6/2018 | Ku | H04L 47/823 |
| 2018/0198917 | A1 | 7/2018 | Ristock | |
| 2019/0171495 | A1* | 6/2019 | Knaup | G06F 9/5088 |
| 2019/0182839 | A1 | 6/2019 | Wells | |
| 2019/0251497 | A1 | 8/2019 | Kattil | |
| 2019/0319895 | A1* | 10/2019 | Zeng | H04L 47/72 |
| 2020/0019445 | A1* | 1/2020 | Altintas | G06F 9/4843 |
| 2020/0089538 | A1 | 3/2020 | Cherniavsky | |
| 2020/0387408 | A1* | 12/2020 | Knaup | G06F 9/5088 |
| 2021/0311791 | A1* | 10/2021 | Rosanova | G06F 16/2477 |
| 2021/0319281 | A1* | 10/2021 | Ji | G06N 3/08 |

OTHER PUBLICATIONS

Disclosed Anonymously, "Proximity Based Clustered Computing," IP.com, IP.Com No. IPCOM000244780D, IP.com Electronic Publication Date: Jan. 14, 2016, 3 pages.

* cited by examiner

ACTIVITY ASSIGNMENT BASED ON RESOURCE AND SERVICE AVAILABILITY

BACKGROUND

The present invention relates generally to the field of computing, and more particularly to a system for resource management.

Individuals carry different types of user devices. These user devices have different levels of resources and capabilities. Resources may include disk space, available power, and skills of the device's user, such as the user's expertise in using different applications on the device. Capabilities may include self-power generation, data processing, and analytic capabilities. The capabilities of any user device may be increased in association with other devices. For example, the user's mobile device may interact with wearable devices, and thus the mobile device may compute biometric data received from the wearable devices. Additionally, capabilities of the user device and the availability of resources may depend on the user's current or predicted future behaviors, such as whether the user is about to attend a meeting or whether the user is idle.

SUMMARY

According to one embodiment, a method, computer system, and computer program product for resource management is provided. The embodiment may include receiving created text of an assigned activity to a proposed assignee. The embodiment may also include identifying information about the assigned activity. The embodiment may further include predicting resources and capabilities required to complete the assigned activity. The embodiment may also include identifying the proposed assignee. The embodiment may further include analyzing the resources and capabilities available on one or more devices of the proposed assignee. The embodiment may also include determining whether the proposed assignee is able to complete the assigned activity. If the proposed assignee is able to complete the assigned activity, a predicted start time and time of completion of the assigned activity may be displayed to an assignor. If the proposed assignee is unable to complete the assigned activity, another assignee that is able to complete the assigned activity may be recommended to the assignor. The embodiment may further include sequencing one or more devices of the other assignee. The embodiment may also include analyzing the resources and capabilities available on one or more devices of a plurality of other assignees. The embodiment may further include displaying one or more reasons to the assignor why the assigned activity cannot be completed by the proposed assignee. The embodiment may also include recommending to the proposed assignee the required resources and capabilities necessary for timely completion of the assigned activity. The embodiment may further include displaying to the proposed assignee the one or more devices of the proposed assignee having the required resources and capabilities to complete the assigned activity.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a system for resource management. The following described exemplary embodiments provide a system, method, and program product to, among other things, analyze available capabilities and resources of a user device and, accordingly, predict a timeframe for estimated completion of the activity. Therefore, the present embodiment has the capacity to improve the technical field of assigning an activity to a user by dynamically and more accurately predicting the resources and capabilities that the activity demands.

As previously described, individuals carry different types of user devices. These user devices have different levels of resources and capabilities. Resources may include disk space, available power, and skills of the device's user, such as the user's expertise in using different applications on the device. Capabilities may include self-power generation, data processing, and analytic capabilities. The capabilities of any user device may be increased in association with other devices. For example, the user's mobile device may interact with wearable devices, and thus the mobile device may compute biometric data received from the wearable devices. Additionally, capabilities of the user device and the availability of resources may depend on the user's current or predicted future behaviors, such as whether the user is about to attend a meeting or whether the user is idle. The availability of resources and capabilities of the user device may also depend on the condition of the user device, the user device's association with other paired devices, and location specific information. Depending upon the availability of resources and capabilities of the user device, it may not always be possible to perform the delegated activity. Contextual availability of the resources and capabilities of the user device may prohibit the completion of the activity. This problem is typically addressed by the manager sending an invitation to all members, i.e., users, of a team to complete the activity, and the first to accept may get assigned the activity. However, sending the invitation to all team members fails to take into account the time spent in waiting for a reply from an individual team member. For example, it may be hours or even days before a team member replies. It may therefore be imperative to have a system in place to evaluate whether any delegated activity will be completed within the allocated timeframe and assign the activity to a particular user accordingly. Thus, embodiments of the present invention may provide advantages including, but not limited to, assigning the activity to the user based on the contextual availability of the resources and capabilities of the user's device, helping the managers predict the chances of completing the activity on time, and reassigning the activity to another user if the device of a particular user does not have the necessary resources and capabilities to carry out the assignment during the allocated timeframe.

According to at least one embodiment, created text of the assigned activity to the proposed assignee may be received. "User" and "assignee" are used interchangeably herein. "Manager and assignor" are also used interchangeably herein. Information about the assigned activity may be identified. The resources and capabilities required to complete the assigned activity may be predicted. The proposed assignee may be identified from the text of the assigned activity. The resources and capabilities available on the one or more devices of the proposed assignee may be analyzed. In response to determining the proposed assignee is able to complete the assigned activity, the predicted start time and time of completion of the assigned activity may be displayed to the assignor. In response to determining the proposed assignee is unable to complete the assigned activity, another assignee that is able to complete the assigned activity may be recommended to the assignor and the one or more reasons why the assigned activity cannot be completed by the proposed assignee may be displayed to the assignor. The one or more devices of the other assignee may be sequenced. According to at least one other embodiment, the resources and capabilities available on the one or more devices of the plurality of other assignees may be analyzed. In the present embodiment, the required resources and capabilities necessary for timely completion of the assigned activity may be recommended to the proposed assignee and the one or more devices of the proposed assignee having the required resources and capabilities to complete the assigned activity may be displayed to the proposed assignee. According to at least one other embodiment, a future availability of resources and capabilities on the one or more devices of the proposed assignee may be predicted based on one or more of the following: health conditions of the proposed assignee; the start time and time of completion of the assigned activity; weather conditions at a location of the assigned activity; and a type of the assigned activity to be completed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze the available capabilities and resources of the user device and, accordingly, predict the timeframe for estimated completion of the activity.

Figure 1:
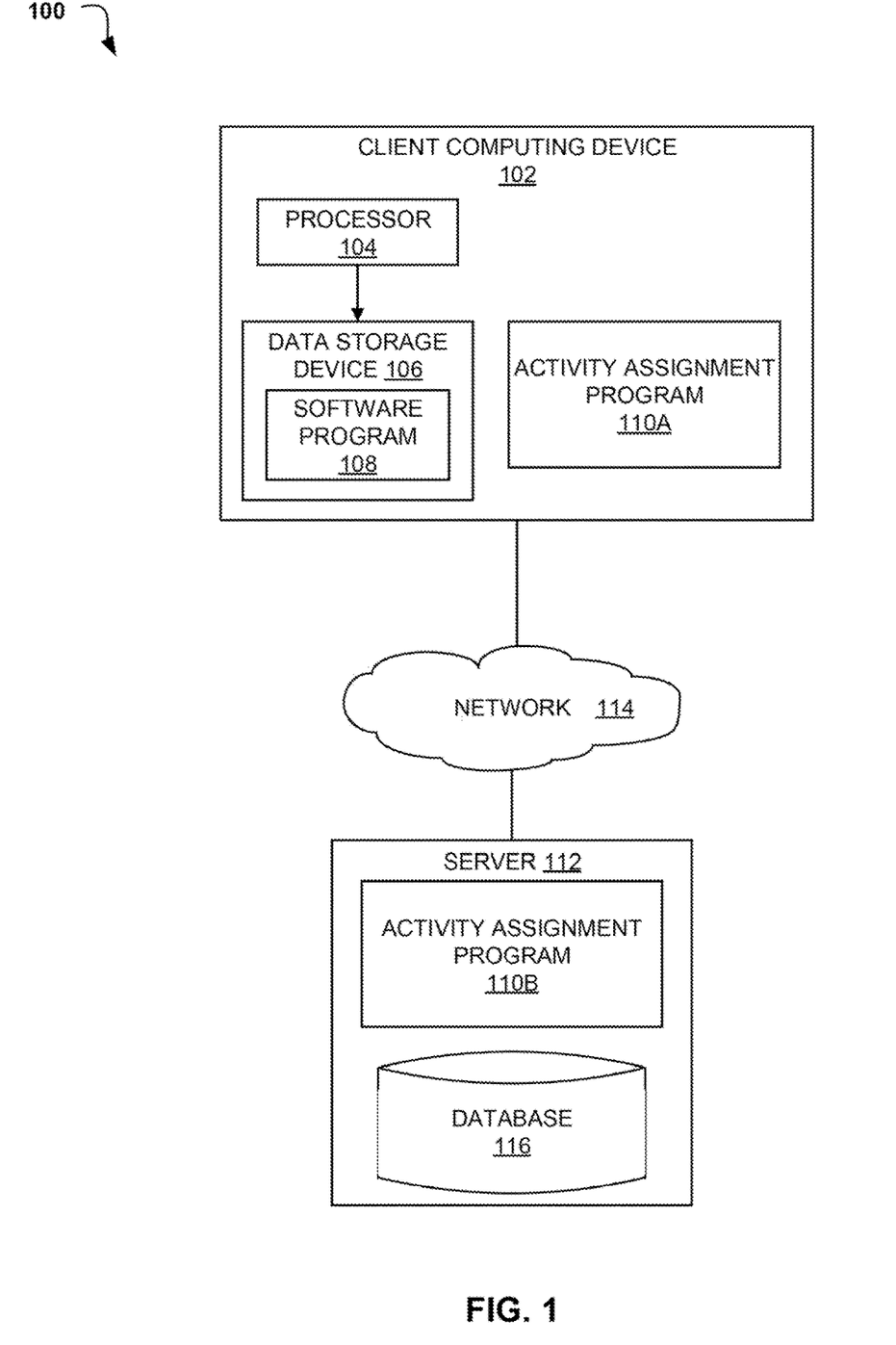
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an activity assignment program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running an activity assignment program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the activity assignment program 110A, 110B may be a program capable of assigning the activity to the user based on the contextual availability of the resources and capabilities of the user's device, helping the managers predict the chances of completing the activity on time, and reassigning the activity to another user if the device of a particular user does not have the necessary resources and capabilities to carry out the assignment during the allocated timeframe. The activity assignment method is explained in further detail below with respect to FIG. 2.

Figure 2:
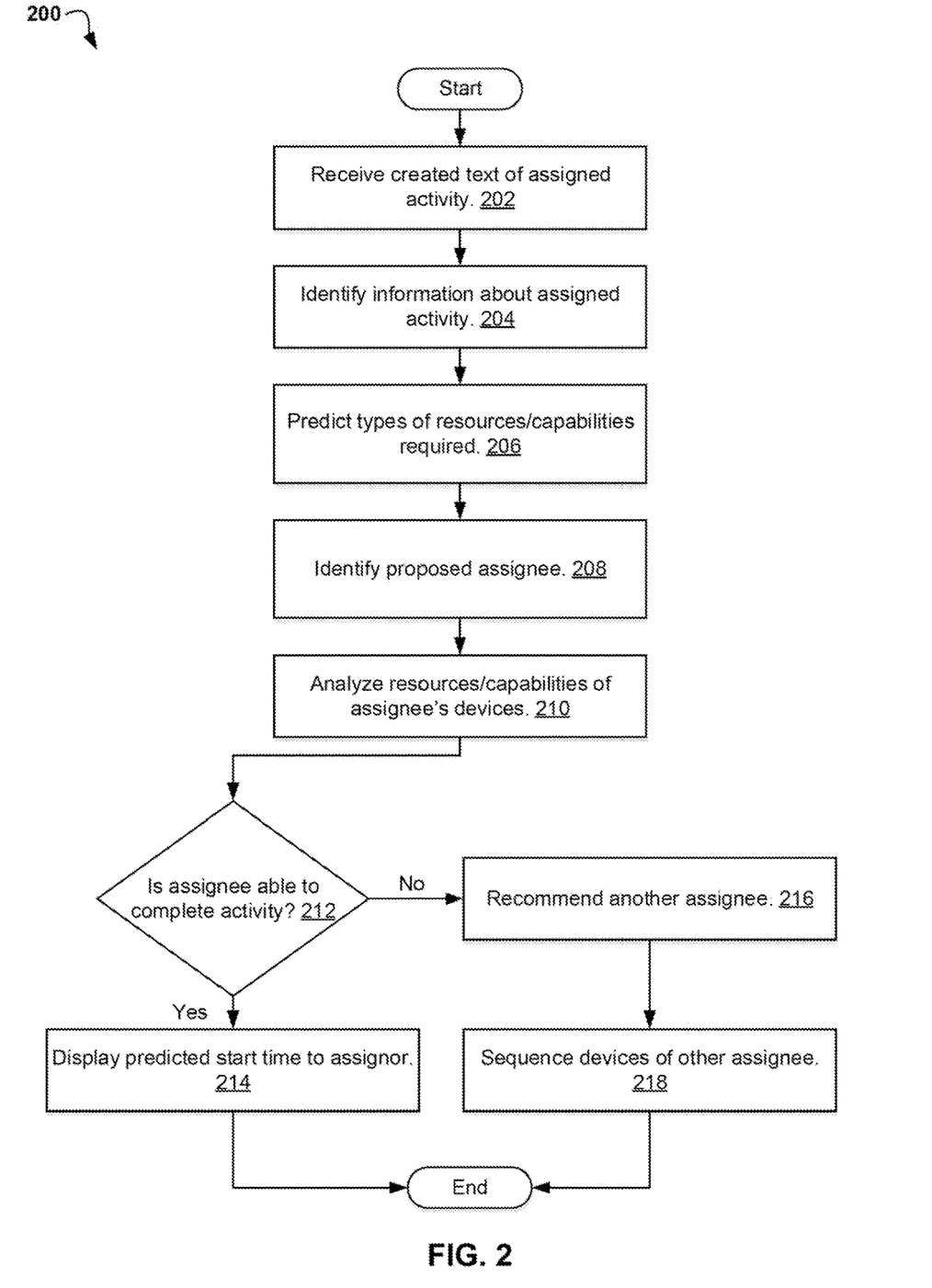
FIG. 2 illustrates an operational flowchart for managing resources in a dynamic resource management process according to at least one embodiment.

Referring now to FIG. 2, an operational flowchart for managing resources in a dynamic resource management process 200 is depicted according to at least one embodiment. At 202, the activity assignment program 110A, 110B receives created text of the assigned activity. The assignor may create text of the activity to be assigned to the assignee. The assignor may use any messaging application to create the text, such as SMS, email, instant messaging, and WhatsApp® (WhatsApp and all WhatsApp-based trademarks and logos are trademarks or registered trademarks of Facebook, Inc. and/or its affiliates). The assignor may also use voice messaging, as well as virtual assistants such as Google Home® (Google Home and all Google Home-based trademarks and logos are trademarks or registered trademarks of Google, LLC and/or its affiliates) and Alexa® (Alexa and all Alexa-based trademarks and logos are trademarks or registered trademarks of Amazon.com, Inc. and/or its affiliates). Speech-to-text may further be used to compose the text. For example, the assignor may compose text saying, "Hello user A, can you please complete editing the video for publication by Friday at noon?"

Then, at 204, the activity assignment program 110A, 110B identifies information about the assigned activity. The activity assignment program 110A, 110B may perform contextual analysis of the "message to be sent" utilizing natural language processing (NLP) to identify information about the assigned activity such as the priority of the assigned activity, type of the assigned activity, and a timeline of completion of the assigned activity. Continuing the example above, if the assignor had used the word "urgent" or the like in the composed text, such a word may indicate the assigned activity to be completed is a top priority. Furthermore, the phrase "editing the video for publication" as described above may indicate the activity is to be completed on some computing device and by a predesignated publication date.

Next, at 206, the activity assignment program 110A, 110B predicts the resources and capabilities required to complete the assigned activity. As described above, resources of the one or more devices may include disk space, available power, internet bandwidth, and skills of the device's user, such as the user's expertise in using different applications on the device. Capabilities of the one or more devices may include self-power generation, data processing, and analytic capabilities. These capabilities and resources of the one or more devices may be shared with the cloud server and the cloud server may be available to a plurality of other assignees, described in further detail below. The activity assignment program 110A, 110B may obtain the location information of one or more assignees, using GPS, to capture the current behaviors of the one or more assignees. For example, the current behavior of any assignee may be that the assignee is attending a meeting, or that the assignee is sitting idly at home. The cloud server may historically gather each assigned activity, as well as the resources and capabilities required for timely completion of the assigned activity. Continuing the example above, if the assigned activity is video editing, and the prescribed deadline set by the assignor is Friday at noon, if the video editing activity is completed after the prescribed deadline, the activity assignment program 110A, 110B may recognize that additional resources and capabilities may be required in order to complete the video editing activity on time. The data on current behavior, historical data on each activity assigned, and data on whether the assigned activity was timely completed may be added to a knowledge corpus. Using historical learning from the data in the knowledge corpus, the activity assignment program 110A, 110B may identify the consumption of resources and capabilities of the one or more devices in performing a given assigned activity and make a prediction of the resources and capabilities required to complete the current assigned activity accordingly.

Then, at 208, the activity assignment program 110A, 110B identifies the proposed assignee. Using NLP as described above, the activity assignment program may identify the proposed assignee from the text of the assigned activity. For example, in "Hello user A" as described above, user A may be identified as the proposed assignee. The activity assignment program 110A, 110B may also detect the number of devices the assignee has. For example, the assignee may have a laptop, a mobile phone, and a smart watch.

Next, at 210, the activity assignment program 110A, 100B analyzes the resources and capabilities that are available on the one or more devices of the proposed assignee. The resources and capabilities that are available may be analyzed on a real-time basis. As described above, the available resources and capabilities of one device of the proposed assignee may be increased in association with other devices of the proposed assignee. For example, a mobile device of User A may interact with one or more wearable devices, such as a smartwatch. The activity assignment program 110A, 110B may take into consideration the aggregated availability of resources and capabilities on each of the one or more devices of the proposed assignee. For example, User A's mobile device may not have the required disc space to complete the assigned activity, but the mobile device may be paired with User A's laptop. In this manner, the aggregated resources and capabilities on the laptop and mobile device may be sufficient to complete the assigned activity in a timely fashion.

According at least one other embodiment, the resources and capabilities available on the one or more devices of the plurality of other assignees may be analyzed. For example, one or more devices of User B, one or more devices of User C, one or more devices of User D, and so on may be analyzed to obtain the available resources and capabilities of the one or more devices of the plurality of other assignees. By analyzing the one or more devices of the plurality of other assignees, the activity assignment program 110A, 110B may be able to recommend an alternative assignee to the assignor, described in further detail below.

In the present embodiment, at 212, the activity assignment program 110A, 110B determines whether the proposed assignee is able to complete the assigned activity. Based on the analysis of the resources and capabilities that are available on the one or more devices of the proposed assignee, the activity assignment program may determine whether the proposed assignee is able to complete the assigned activity. For example, the resources and capabilities available on User A's one or more devices may be analyzed to determine whether an activity assigned to User A from the assignor will be productive. The activity assignment program may recommend to the proposed assignee the required resources and capabilities that are necessary for timely completion of the assigned activity. Furthermore, the one or more devices of the proposed assignee having the required resources and capabilities to complete the assigned activity may be displayed to the proposed assignee. For example, the one or more devices may be displayed to the proposed assignee via text message to the proposed assignee's smartphone. If the activity assignment program 110A, 110B determines the proposed assignee is able to complete the assigned activity, the dynamic user activity assignment process 200 may proceed to step 214 to display to the assignor the predicted start time and time of completion of the assigned activity. If the activity assignment program 110A, 110B determines the proposed assignee is unable to complete the assigned activity, the dynamic user activity assignment process 200 may proceed to step 216 to recommend another assignee that is able to complete the assigned activity.

Then, at 214, the activity assignment program 110A, 110B displays the predicted start time and time of completion of the assigned activity to the assignor. For example, a text notification may be sent to the assignor's smartphone saying, "User A has sufficient available resources and capabilities to complete video editing by Friday at noon."

According to at least one other embodiment, the future availability of resources and capabilities on the one or more devices of the proposed assignee may be predicted. For example, the assignor may know from experience that User A does the best job when it comes to video editing. Assuming the activity assignment program 110A, 110B does not recognize the assigned activity to be a priority, a predicted start time and time of completion of the assigned activity beyond the original deadline may be derived. Continuing the example above, the new start time may be Friday at 3 p.m. and the time of completion may be Friday at 7 p.m. To predict the future availability of resources and capabilities, the activity assignment program 110A, 110B may take into account several factors from historical data in the knowledge corpus, including but not limited to, the health conditions of the proposed assignee, the start time and time of completion of the assigned activity, the weather conditions at a location of the assigned activity, and/or the type of the assigned activity to be completed. Continuing the example above where the new start time is Friday at 3 p.m. and the time of completion is Friday at 7 p.m, the activity assignment program 110A, 110B may recognize that User A typically exercises during that period, and uses an app on his smartphone to measure biometrics such as his heart rate, blood pressure, and/or oxygen level. This app may use more battery power on the smartphone than if the smartphone were in an idle state. It may therefore be predicted that User A does not have the required resources and capabilities during this time period. Accordingly, the activity assignment program 110A, 110B may prompt the assignor to update the timeline for completing the activity. In another example, if the type of activity is video editing, and the weather is predicted to be raining between 3 p.m. and 7p.m. on Friday, the activity assignment program 110A, 110B may recognize from historical data that when it rains internet speed slows down and thus User A may not have the required resources and capabilities during this time period. Accordingly, the activity assignment program 110A, 110B may prompt the assignor to update the timeline for completing the activity.

In the present embodiment, at 216, the activity assignment program 110A, 110B recommends to the assignor another assignee that is able to complete the assigned activity. Based on the analysis of the resources and capabilities available on the one or more devices of the plurality of other assignees, the other assignee having the required resources and capabilities may be recommended. Along with the recommendation, one or more reasons as to why the assigned activity cannot be complete by the proposed assignee may be displayed to the assignor. For example, the assignor may receive a text notification on his smartphone saying, "User A's Device does not have enough space, and he is travelling now. User B can complete the assigned activity."

Next, at 218, the activity assignment program 110A, 110B sequences the one or more devices of the other assignee. The sequence may order the one or more devices from a device having the most available resources and capabilities to a device having the least available resources and capabilities. Continuing the above example, if User A is unable to complete the assigned activity, User B may be recommended to the assignor. User B may have a laptop and a smartphone. If the laptop has 8 GB of RAM and the smartphone has 4 GB of RAM, then User B may be recommended to perform the assigned activity on the laptop. The predicted start time and time of completion of the assigned activity may be updated based on the availability of resources and capabilities on each of the other assignee's devices. For example, the devices of User B may have a higher capacity battery and greater processing speeds than the devices of User A. Accordingly, User B's timeline for completing the assigned activity may be sooner than User A's timeline for completing the assigned activity.

It may be appreciated that FIG. 2 provides only an illustration of one implementation and does not imply any limitations with regard to how different embodiments may be implemented. Many modifications to the depicted environments may be made based on design and implementation requirements.

Figure 3:
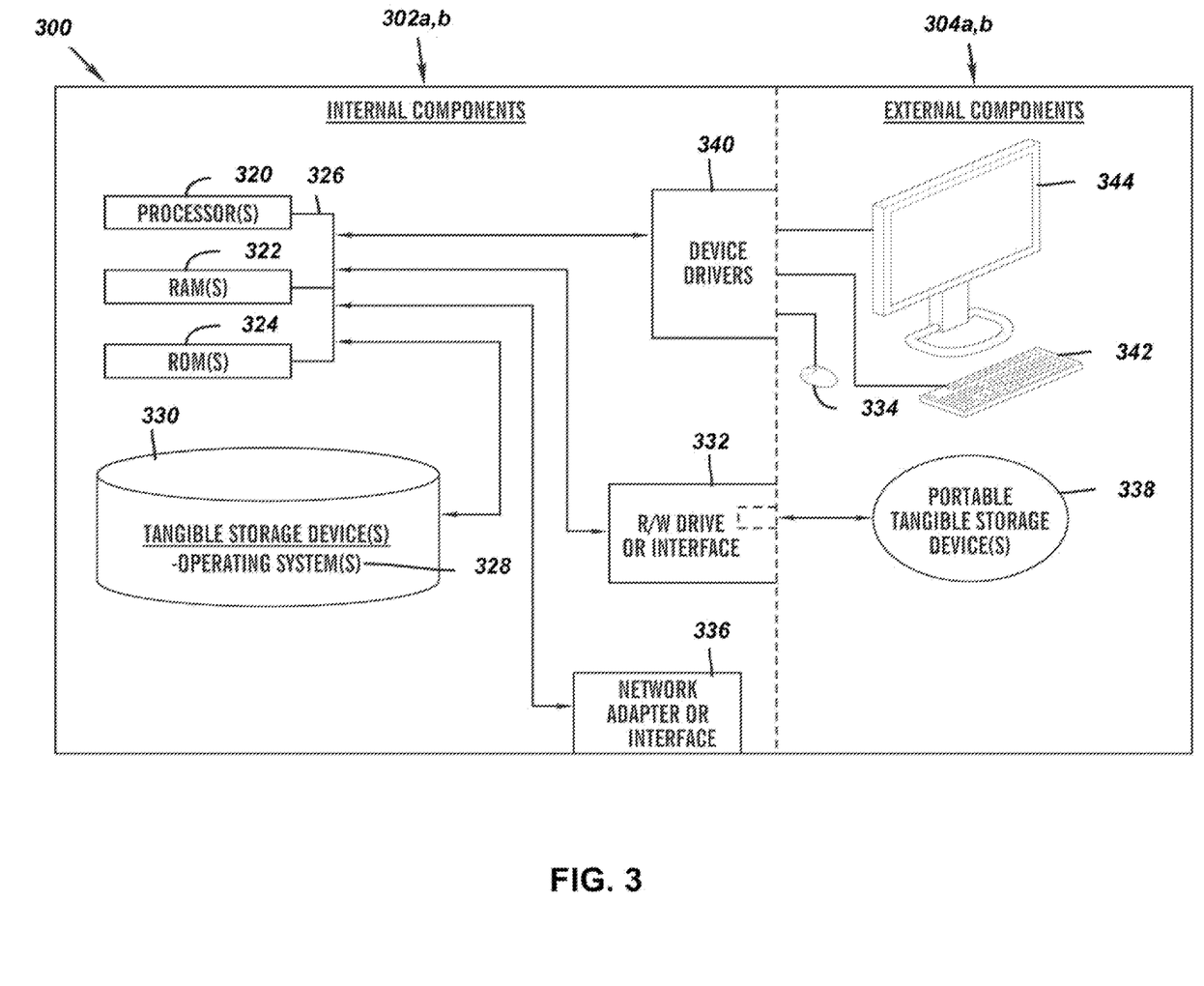
FIG. 3 is a functional block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the activity assignment program 110A in the client computing device 102 and the activity assignment program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the activity assignment program 110A, 110B, can be stored on one or more of the respective portable computer-readable tangible storage devices 338, read via the respective R/W drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The software program 108 and the activity assignment program 110A in the client computing device 102 and the activity assignment program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the activity assignment program 110A in the client computing device 102 and the activity assignment program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
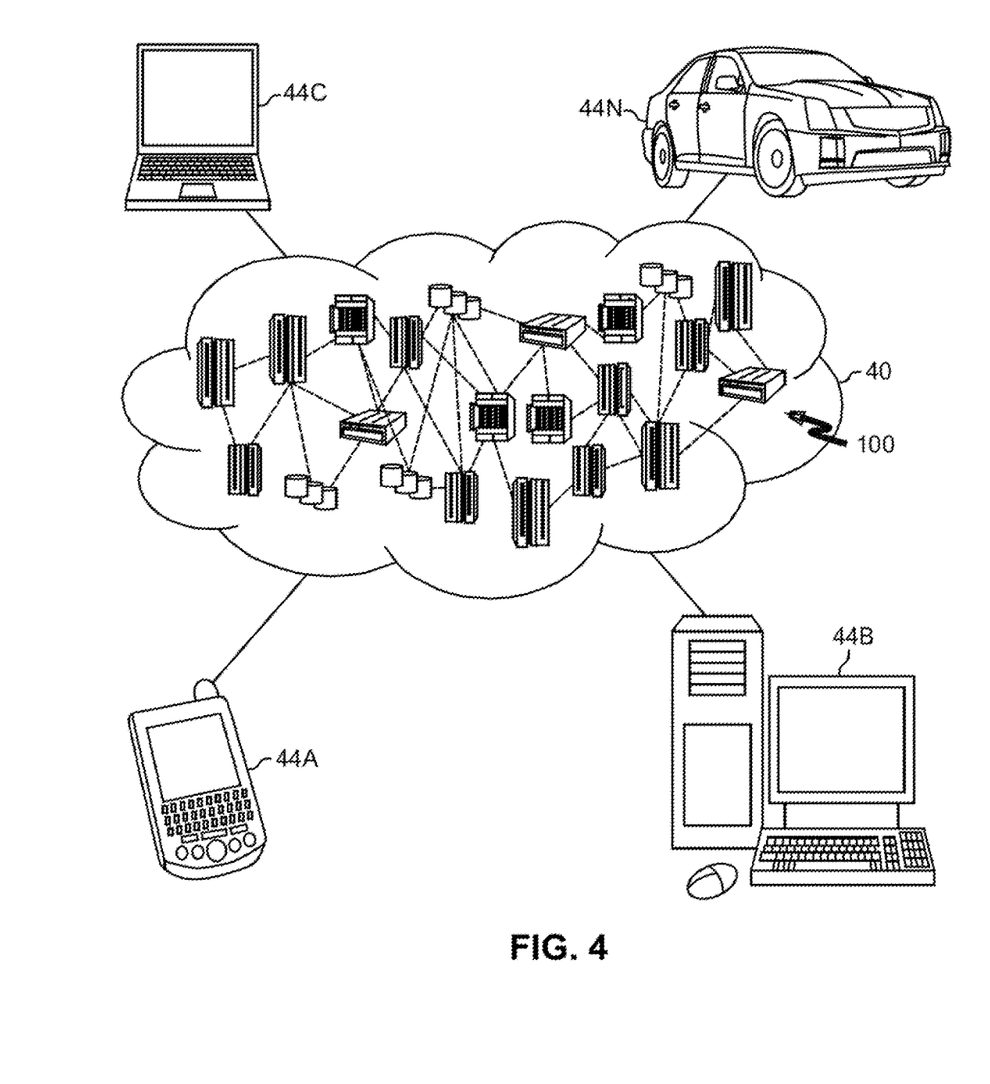
FIG. 4 depicts a cloud computing environment according to an embodiment of the present invention.

Referring now to FIG. 4, illustrative cloud computing environment 40 is depicted. As shown, cloud computing environment 40 comprises one or more cloud computing nodes 100 with which local computing devices used by cloud consumers, such as, for example, personal digital assistant (PDA) or cellular telephone 44A, desktop computer 44B, laptop computer 44C, and/or automobile computer system 44N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 4 are intended to be illustrative only and that computing nodes 100 and cloud computing environment 40 can communicate with any type of computerized device over any type of network and/or network addressable connection (e.g., using a web browser).

Figure 5:
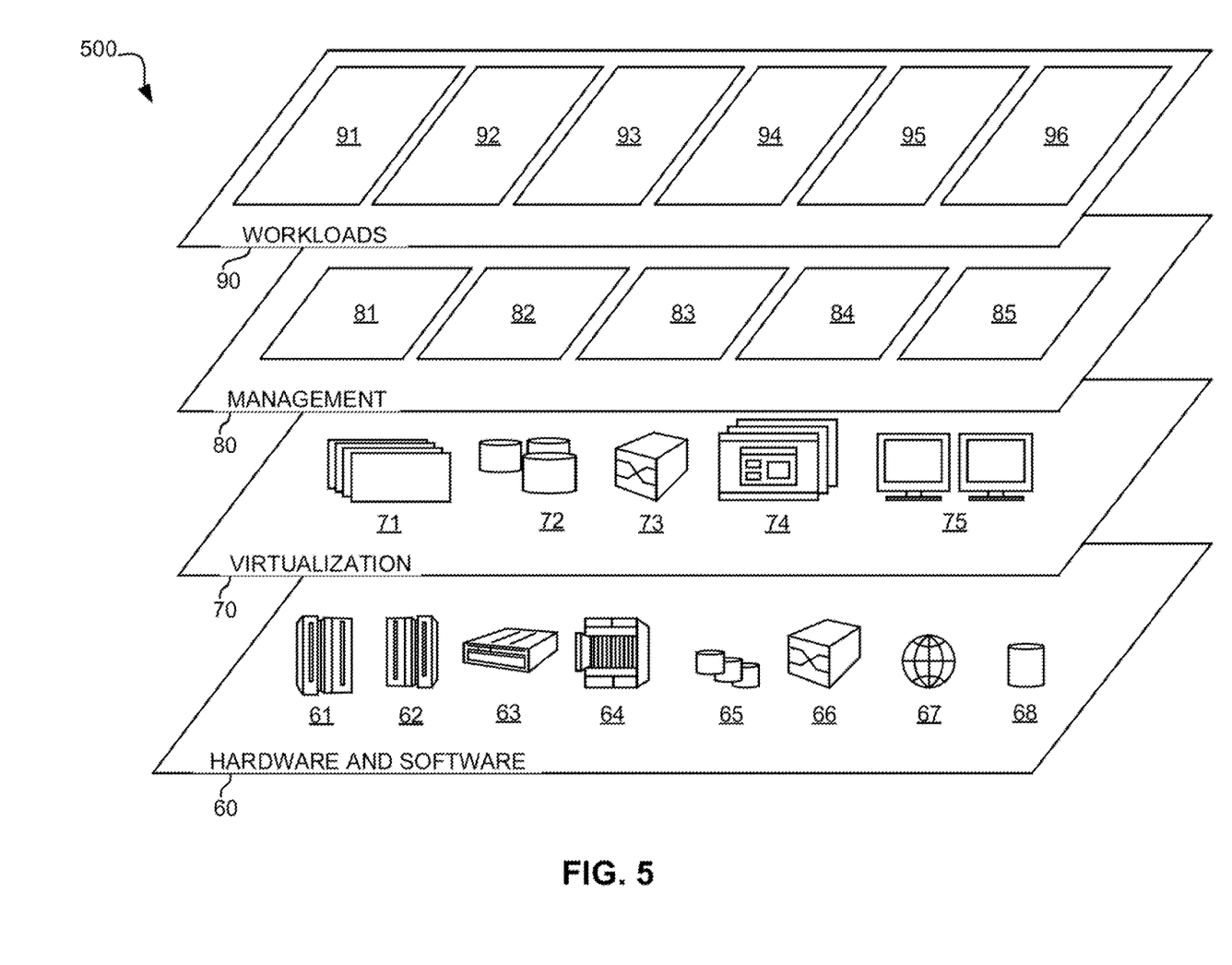
FIG. 5 depicts abstraction model layers according to an embodiment of the present invention.

Referring now to FIG. 5, a set of functional abstraction layers 500 provided by cloud computing environment 40 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource management 96. Resource management 96 may relate to analyzing the available capabilities and resources of the user device in order to predict the timeframe for estimated completion of the activity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of assigning an activity, the method comprising:
    receiving created text of an assigned activity to a proposed assignee;
    identifying information about the assigned activity;
    predicting resources and capabilities required to complete the assigned activity, wherein the predicted resources include an amount of disk space to complete the assigned activity, power required to complete the assigned activity, and internet bandwidth to complete the assigned activity, and wherein the predicted capabilities include self-power generation capability to complete the assigned activity, data processing capability to complete the assigned activity, and analytic capability to complete the assigned activity;
    identifying the proposed assignee from the text of the assigned activity;
    analyzing the resources and capabilities available on one or more devices of the proposed assignee, wherein the analyzing further comprises:
        identifying an aggregated availability of the analyzed resources and capabilities on multiple devices of the proposed assignee; and
        causing at least two devices of the proposed assignee to pair with each other in response to determining at least one device of the proposed assignee does not have the required predicted resources and capabilities;
    determining whether the proposed assignee is able to complete the assigned activity based on the analyzed resources and capabilities;
    in response to determining the proposed assignee is able to complete the assigned activity, displaying to an assignor a predicted start time and time of completion of the assigned activity; and
    in response to determining the proposed assignee is unable to complete the assigned activity, recommending to the assignor another assignee that is able to complete the assigned activity.

2. The method of claim 1, wherein the identified information is selected from a group consisting of a type of the assigned activity, a priority of the assigned activity, and a timeline of the assigned activity.

3. The method of claim 1, further comprising:
    sequencing one or more devices of the other assignee, wherein the sequencing orders the one or more devices from a device having the most available resources and capabilities to a device having the least available resources and capabilities.

4. The method of claim 1, wherein the analyzing further comprises analyzing the resources and capabilities available on one or more devices of a plurality of other assignees.

5. The method of claim 1, further comprising:
    displaying one or more reasons to the assignor why the assigned activity cannot be completed by the proposed assignee.

6. The method of claim 1, further comprising:
    recommending to the proposed assignee the required resources and capabilities necessary for timely completion of the assigned activity; and displaying to the proposed assignee the one or more devices of the proposed assignee having the required resources and capabilities to complete the assigned activity.

7. The method of claim 1, further comprising:
predicting a future availability of the resources and capabilities on the one or more devices of the proposed assignee, wherein a basis for the future availability is selected from a group consisting of health conditions of the proposed assignee, the start time and time of completion of the assigned activity, weather conditions at a location of the assigned activity, and a type of the assigned activity to be completed.

8. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving created text of an assigned activity to a proposed assignee;
identifying information about the assigned activity;
predicting resources and capabilities required to complete the assigned activity, wherein the predicted resources include an amount of disk space to complete the assigned activity, power required to complete the assigned activity, and internet bandwidth to complete the assigned activity, and wherein the predicted capabilities include self-power generation capability to complete the assigned activity, data processing capability to complete the assigned activity, and analytic capability to complete the assigned activity;
identifying the proposed assignee from the text of the assigned activity;
analyzing the resources and capabilities available on one or more devices of the proposed assignee, wherein the analyzing further comprises:
 identifying an aggregated availability of the analyzed resources and capabilities on multiple devices of the proposed assignee; and
 causing at least two devices of the proposed assignee to pair with each other in response to determining at least one device of the proposed assignee does not have the required predicted resources and capabilities;
determining whether the proposed assignee is able to complete the assigned activity based on the analyzed resources and capabilities;
in response to determining the proposed assignee is able to complete the assigned activity, displaying to an assignor a predicted start time and time of completion of the assigned activity; and
in response to determining the proposed assignee is unable to complete the assigned activity, recommending to the assignor another assignee that is able to complete the assigned activity.

9. The computer system of claim 8, wherein the identified information is selected from a group consisting of a type of the assigned activity, a priority of the assigned activity, and a timeline of the assigned activity.

10. The computer system of claim 8, further comprising:
sequencing one or more devices of the other assignee, wherein the sequencing orders the one or more devices from a device having the most available resources and capabilities to a device having the least available resources and capabilities.

11. The computer system of claim 8, wherein the analyzing further comprises analyzing the resources and capabilities available on one or more devices of a plurality of other assignees.

12. The computer system of claim 8, further comprising:
displaying one or more reasons to the assignor why the assigned activity cannot be completed by the proposed assignee.

13. The computer system of claim 8, further comprising:
recommending to the proposed assignee the required resources and capabilities necessary for timely completion of the assigned activity; and
displaying to the proposed assignee the one or more devices of the proposed assignee having the required resources and capabilities to complete the assigned activity.

14. The computer system of claim 8, further comprising:
predicting a future availability of the resources and capabilities on the one or more devices of the proposed assignee, wherein a basis for the future availability is selected from a group consisting of health conditions of the proposed assignee, the start time and time of completion of the assigned activity, weather conditions at a location of the assigned activity, and a type of the assigned activity to be completed.

15. A computer program product, the computer program product comprising:
one or more computer-readable tangible storage medium and program instructions stored on at least one of the one or more tangible storage medium, the program instructions executable by a processor capable of performing a method, the method comprising:
receiving created text of an assigned activity to a proposed assignee;
identifying information about the assigned activity;
predicting resources and capabilities required to complete the assigned activity, wherein the predicted resources include an amount of disk space to complete the assigned activity, power required to complete the assigned activity, and internet bandwidth to complete the assigned activity, and wherein the predicted capabilities include self-power generation capability to complete the assigned activity, data processing capability to complete the assigned activity, and analytic capability to complete the assigned activity;
identifying the proposed assignee from the text of the assigned activity;
analyzing the resources and capabilities available on one or more devices of the proposed assignee, wherein the analyzing further comprises:
 identifying an aggregated availability of the analyzed resources and capabilities on multiple devices of the proposed assignee; and
 causing at least two devices of the proposed assignee to pair with each other in response to determining at least one device of the proposed assignee does not have the required predicted resources and capabilities;
determining whether the proposed assignee is able to complete the assigned activity based on the analyzed resources and capabilities;
in response to determining the proposed assignee is able to complete the assigned activity, displaying to an assignor a predicted start time and time of completion of the assigned activity; and in response to determining the proposed assignee is unable to complete the assigned activity, recommending to the assignor another assignee that is able to complete the assigned activity.

16. The computer program product of claim 15, wherein the identified information is selected from a group consisting of a type of the assigned activity, a priority of the assigned activity, and a timeline of the assigned activity.

17. The computer program product of claim 15, further comprising:

sequencing one or more devices of the other assignee, wherein the sequencing orders the one or more devices from a device having the most available resources and capabilities to a device having the least available resources and capabilities.

18. The computer program product of claim 15, wherein the analyzing further comprises analyzing the resources and capabilities available on one or more devices of a plurality of other assignees.

19. The computer program product of claim 15, further comprising:

displaying one or more reasons to the assignor why the assigned activity cannot be completed by the proposed assignee.

20. The computer program product of claim 15, further comprising:

recommending to the proposed assignee the required resources and capabilities necessary for timely completion of the assigned activity; and displaying to the proposed assignee the one or more devices of the proposed assignee having the required resources and capabilities to complete the assigned activity.

* * * * *